United States Patent [19]

Gaski

[11] 4,277,035

[45] Jul. 7, 1981

[54] FLEXIBLE MEMBER CADDY

[76] Inventor: John M. Gaski, 5821 N. Lacey, Chicago, Ill. 60606

[21] Appl. No.: 66,071

[22] Filed: Aug. 13, 1979

[51] Int. Cl.³ .......................................... B65H 75/36
[52] U.S. Cl. .................................... 242/85.9; 242/129
[58] Field of Search .................. 242/53, 85.1, 96, 104, 242/105, 127, 129–129.5

[56] References Cited

U.S. PATENT DOCUMENTS

| 1,728,106 | 9/1929 | Collins | 242/85.1 |
| 2,665,805 | 1/1954 | Schaefer | 242/85.1 |
| 2,747,812 | 5/1956 | Lassen | 242/96 |
| 3,290,453 | 12/1966 | Jensen | 242/85.1 |

*Primary Examiner*—Leonard D. Christian

[57] ABSTRACT

The present invention relates to an apparatus for windably receiving and storably holding an elongated continuous flexible member. The flexible member is easily and rapidly removed from the apparatus. The apparatus generally includes an elongated columnar support. A lower arm is secured to the columnar support adjacent to the lower end. The lower arm forms an acute angle with that portion of the columnar support adjacent to the lower end thereof. An upper arm is releasably secured to the columnar support adjacent to the upper end of the columnar support. The upper arm forms an acute angle with that portion of the columnar support adjacent to the upper end. When the upper arm is released relative to the columnar support, the flexible member is readily removed from the apparatus at a wound unit.

14 Claims, 3 Drawing Figures

FLEXIBLE MEMBER CADDY

BACKGROUND OF THE INVENTION

A homeowner generally has a number of electrically powered pieces of equipment, such as, edge trimmers, saws, lawnmowers, snowblowers and the like. One of the problems with utilization of such equipment is that when it is necessary to use the equipment, at a point some distance from an electrical outlet, it is necessary to provide an extension cord to provide electrical current to the given piece of equipment. Inasmuch as the extension cord is not used on a regular basis, it is desirable to be able to store the extension cord in a suitable storage area and then transport the cord to an electrical outlet and extend the cord to the place for utilization of the piece of equipment. The cord may be anywhere from fifty to two hundred feet long or longer, and the homeowner has a problem in storing and transporting the cord. A variety of reels are provided for holding the cord but ordinarily the reels must be fixed to a permanent location or must be mounted on a stand. It is particularly desirable to provide a simple and inexpensive device which may receive an electrical cord but still be readily portable and allow the cord to be put into use with a minimum of effort.

SUMMARY OF INVENTION

The present invention relates to an apparatus which has an elongated continuous flexible member wound thereon into a wound unit and the wound unit is stored on the apparatus. The wound unit may be selectively rapidly removed from the apparatus for use. The apparatus includes an elongated flat columnar support having a support on the upper end thereof. A upper arm is releasably secured to columnar support adjacent to the support head. A lower arm is secured to the columnar support adjacent to the lower end of the columnar support. The lower arm forms an acute angle with the portion of the columnar support adjacent to the lower end of the support. Release of the upper arm relative to the columnar support allows the wound unit of elongated continuous flexible member to be removed from the arms for use. The support head provides a convenient means for supporting the apparatus during storage or transportation.

It is a principle object of the present invention to provide an apparatus for storing an elongated continuous flexible member which is wound onto the apparatus.

It is another object of the instant invention to provide an apparatus for storing a flexible member and allowing the flexible member to be released readily therefrom.

It is still a further object of this invention to provide a receiving and storing apparatus for a continuous flexible member which is economical to manufacture and easy to handle.

Other objects and uses of the herein disclosed invention will become readily apparent to those skilled in the art upon a perusal of the following specification in light of the accompanying drawing.

DESCRIPTION OF THE PREFERRED EMBODIMENT

Figures 1, 2, 3:
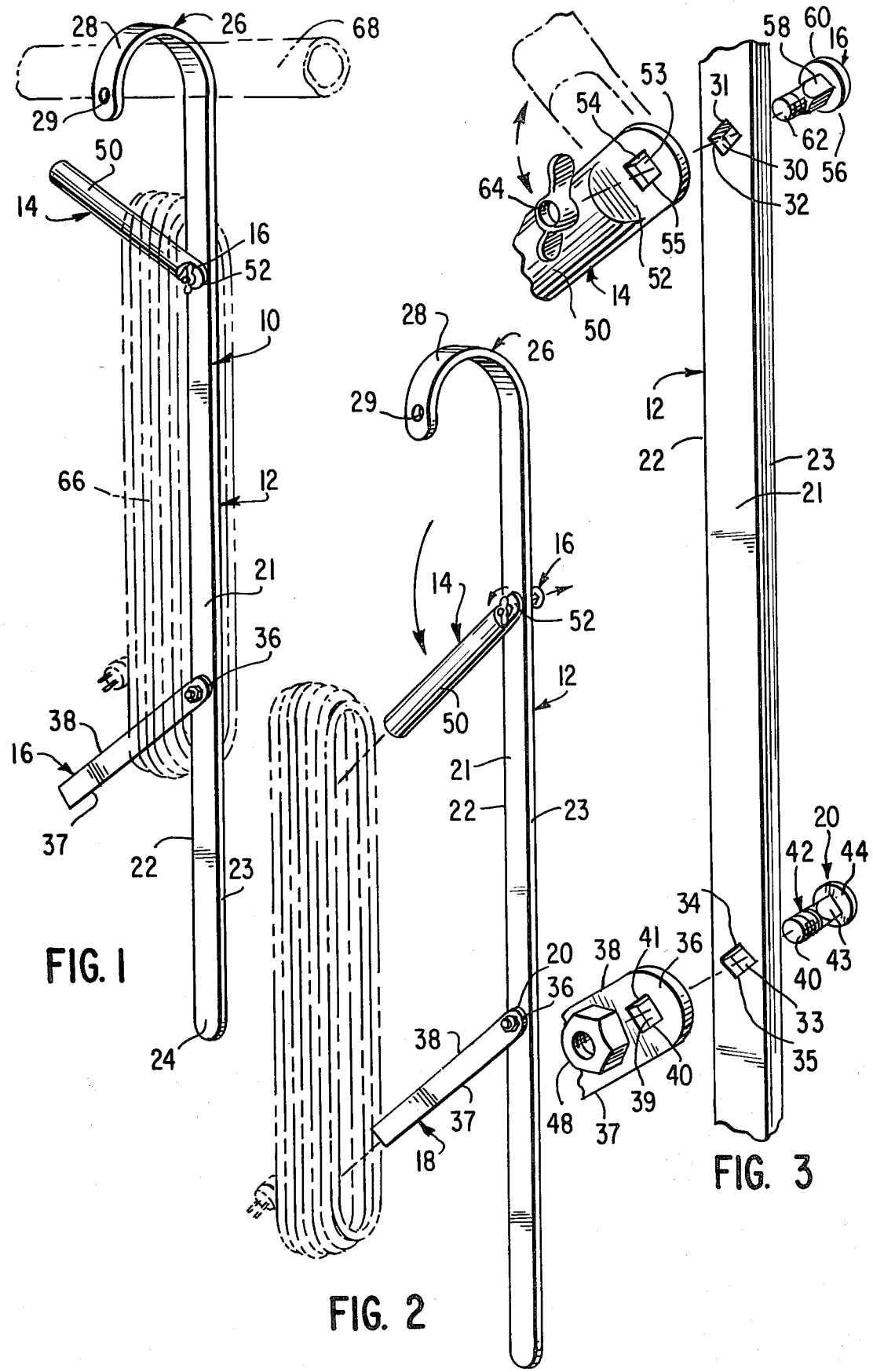
FIG. 1 is a perspective view of an apparatus embodying the herein disclosed invention showing in phantom view an elongated continuous flexible conductive member mounted thereon.
FIG. 2 is a perspective view of the apparatus of FIG. 1 showing an upper arm released relative to a columnar support to allow the conductive member to be removed as a wound unit.
FIG. 3 is an enlarged fragmentary exploded view of a portion of a column of the apparatus of FIG. 1 with portions of the upper arm and a lower arm adjacent to the column with fasteners used for securing the arms to the column.

Referring now to the drawings and especially to FIG. 1, a cord caddy, generally indicated by number 10, is shown thereon which cord caddy 10 is specific embodiment of the herein disclosed invention. Cord caddy 10 generally includes an elongated support 12 with an upper arm 14 releasably connected thereto by upper fastener and a lower arm 18 connected thereto by a lower fastener 20.

Support 12 is an elongated flat columnar support which has a straight flat column 21 having a pair of opposed parallel edges 22 and 23. A rest end 24 is formed integral with the lower end of column 21. A support head 26 is formed integral with the upper end of column 21. The support head includes a flat arcuate band 28 which has one end integral with column 21 and the other end is free. A support aperture 29 is formed in the free end of the arcuate band.

The column has an upper aperture 30 formed therein adjacent to the upper end. Aperture 30 is square and a diagonal from corner 31 to the opposite corner 32 of aperture 30 is parallel to longitudinal edges 22 and 23 of column 21. A lower aperture 33 is formed in the column adjacent to rest end 24. Square aperture 33 is identical in size and shape to aperture 30 and is aligned in the column so that a diagonal between corner 34 and opposite corner 35 of the square is aligned parallel to the longitudinal edges 22 and 23 of the column and is in line with a diagonal through opposite corners 31 and 32 of aperture 30.

Lower arm 18 is a piece of flat bar stock having a rounded end 36 on one end and a pair of opposed parallel edges 37 and 38. Arm 18 has a lower arm square aperture 39 formed therein. Square aperture 39 is identical in size and shape to square aperture 33 in column 21. A pair of opposed sides 40 and 41 of square aperture 39 is parallel to opposed edges 37 and 38 of arm 18. The arm 18 is positioned adjacent to column 21, so that the square aperture 39 is in registry with square aperture 33. Fastener 20 secures the lower arm to column 21.

Fastener 20 includes a bolt 42 having a square shank 43. The length of the shank is greater than the thickness of either flat column 21 or lower arm 18 so that the square shank 42 is simultaneously mateably received in square apertures 33 and 39. The square shank 43 has a round head 44 formed integral with one end and a threaded shank 46 formed integral with the other end of the square shank. A nut 48 is threadably mounted on threaded shank 46. The nut holds the bolt 42 in position so that the square aperture 39 is held in registry with the square aperture 33 thereby positioning lower arm in an attitude to form a 45° angle with that portion of the column adjacent to rest end 24.

Upper arm 14 is a circular tubular body 50 which has an elongated center axis along its length. Arm 14 has a flat end 52 formed integral with one end of the body. Flat end 52 has an upper arm aperture 53 formed therein which is identical in size and shape to square aperture 30 in column 21. Aperture 53 is square and has a pair of opposed sides 54 and 55 parallel to the center axis of the tubular body. Upper arm 14 is positioned adjacent to the column 21 with square aperture 53 in registry with the square aperture 30 to form a 45° angle between the upper arm 14 and that portion of column 21 adjacent to support head 26.

The upper arm is releasably secured to column 21 by fastener 16. The fastener 16 includes a bolt 56 which has a square shank 58. The square shank 58 has a length which is greater than the thickness of either column 21 or flat end 52 of the upper arm. Thus, when square shank 58 is mateable positioned in square apertures 30 and 53, arm 14 is fixed relative to the column with the center axis of the tubular body set at an angle of 45° relative to the opposed edge of that portion of the column adjacent to the support head. Bolt 56 includes a head 60 formed integral with one end of shank 58 and a thread portion 62 formed integral with the other end of shank 58. A wing nut 64 is threadedly mounted on the threaded portion 62 to hold the upper arm against the column 21.

An elongated flexible insulated conductive wire 66 (shown in phantom view) is wound onto caddy 10. The upper arm 14 is secured to column 21 and the wire 66 is wound over the upper arm and down around lower arm 18. The wire is wound on the arms to make up a wound unit. The caddy may be utilized to carry the wound wire. To store the wire, the caddy may be hung over a rod 68 as shown in FIG. 1. The support head may be mounted on a peg by placing a peg in aperture 29. It may be appreciated that the wound wire may be conveniently carried and stored on the caddy.

In order to use the wire and to remove the wire from the caddy, it is not necessary to unwind the wire from the caddy, but rather the entire wound unit may be quickly and conveniently removed from the caddy. It is only necessary to release the wing nut 64 so that the shank 58 may be removed from aperture 53 and the upper arm be allowed to pivot on the threaded portion 62 so that upper arm 14 moves from the attitude shown in FIG. 1 to the attitude shown in FIG. 2. Thus, the entire wound unit of wire may be readily and conveniently slipped off the upper and lower arms. When it is necessary to reload the wire onto the caddy the upper arm is moved into its attitude wherein it forms an acute angle with the upper portion of the column and the wing nut is tightened so that square aperture 53 mates with the square shank 58 to lock the upper arm in its upwardly extending attitude. The wire is then wound onto the upper and lower arms.

Although the caddy has been described in detail as being in use with an insulated wire, it is readily apparent that another elongated flexible member may be mounted on the caddy as desired. Although a specific embodiment of the herein disclosed invention has been described in detail, it is to be expressly understood that those skilled in the art may make various modifications and changes in the herein disclosed invention without departing from the spirit and scope of this invention. It is to be understood that the instant invention is limited only by the appended claims.

What is claimed is:

1. An apparatus for windably receiving and storably holding for rapid removal of an elongated continuous flexible member comprising; an alongated columnar support, a first arm secured to the columnar support adjacent to one end of the columnar support, said first arm forming an acute angle with that portion of the columnar support adjacent to said one end, a second arm secured to the columnar support adjacent to the other end of the columnar support, and means releasably securing the second arm to the columnar support, said second arm forming an acute angle with that portion of the columnar support adjacent to said other end, whereby release of the second arm relative to the columnar support allows an elongated continuous flexible member wound onto said first and second arms to be removed from the apparatus as a wound unit.

2. An apparatus for windably receiving and storably holding for rapid removal of an elongated continuous flexible member as defined in claim 1 including a support head formed integral with the columnar support on the end adjacent to the second arm.

3. An apparatus for windably receiving and storably holding for rapid removal of an elongated flexible member as defined in claim 1 wherein the second arm has a round body adjacent to one end for engagement with and support of the elongated continuous flexible member.

4. An apparatus for windably receiving and storably holding for rapid removal of an elongated continuous flexible member as defined in claim 1, wherein the columnar support is flat, and including a support head formed integral with the columnar support at that end adjacent to the second arm.

5. An apparatus for windably receiving and storably holding for rapid removal of an elongated continuous flexible member as defined in claim 1 wherein, the columnar support has a square aperture adjacent to the other end, the second arm has a flat end adjacent to the other end, the second arm has a flat end adjacent to the columnar support, and the flat end of the second arm has a square aperture registerable with the square aperture of the columnar support, and including a fastener mounted in the square apertures in the second arm and the columnar support for releasably holding the second arm relative to the columnar support.

6. An apparatus for windably receiving and storably holding for rapid removal of an elongated continuous flexible member as defined in claim 1 wherein, the second arm has a rounded body adjacent to one end for engagement with and support of the elongated continuous flexible member, and including a support head formed integral with the columnar support on the end adjacent to the second arm.

7. An apparatus for windably receiving and storably holding for rapid removal of an elongated continuous flexible member as defined in claim 1 wherein, the second arm has a rounded body adjacent to one end for engagement with and support of the elongated continuous flexible member, said second arm has a flat end adjacent to the columnar support, the columnar support is flat, and including a support head formed integral with the columnar support at that end adjacent to the second arm.

8. An apparatus for windably receiving and storably holding for rapid removal of an elongated continuous flexible member as defined in claim 1 wherein, the columnar support is flat and has a square aperture adjacent to the other end, said second arm has a flat end adjacent to the columnar support, and the flat end of the second arm has a square aperture registerable with the square aperture of the columnar support, and including a fastener mounted in the square apertures in the second arm and the columnar support for releasably holding the second arm relative to the columnar support, and a support head formed integral with the columnar support on the end adjacent to the second arm.

9. An apparatus for windably receiving and storably holding for rapid removal of an elongated continuous flexible member as defined in claim 1 wherein, the columnar support is flat, the second arm has a rounded body adjacent to one end for engagement with and support of the elongated continuous flexible member, the other end of the second arm is flat for engagement with the columnar support, and including a support head formed integral with the columnar support at that end adjacent to the second arm.

10. An apparatus for windably receiving and storably holding for rapid removal of an elongated continuous flexible member as defined in claim 1 wherein the columnar support is flat, and the first arm is flat for engagement with the columnar support.

11. An apparatus for windably receiving and storably holding for rapid removal of an elongated continuous flexible member as defined in claim 1 wherein the columnar support is flat, the first arm is flat, the columnar support has a square aperture adjacent to the one end, the first arm has a square aperture registerable with the square aperture of the columnar support, and including a fastener mounted in the square apertures of the first arm and the columnar support, said fastener having a square shank mateably mounted in the square apertures holding the first arm relative to the columnar support.

12. An apparatus for windably receiving and storably holding for rapid removal of an elongated continuous flexible member as defined in claim 1 wherein, the columnar support is flat, the second arm has a rounded body adjacent to one end for engagement with and support of the elongated continuous flexible member, the other end of the second arm is flat for engagement with the columnar support, and the first arm is flat for engagement with the columnar support.

13. An apparatus for windably receiving and storably holding for rapid removal of an elongated continuous flexible member as defined in claim 1 wherein, the columnar support is flat, the second arm has a rounded body adjacent to one end for engagement with and support of the elongated continuous flexible member, the other end of the second arm is flat for engagement with the columnar support, the columnar support has a square aperture adjacent to the other end, the flat end of the second arm has a second arm square aperture registerable with the square aperture of the columnar support, the first arm is flat, the columnar support has a second columnar square aperture adjacent to the one end, the first arm has a first arm square aperture registerable with the second columnar square aperture of the columnar support, and including; a first fastener mounted in the square aperture of the first arm and the square aperture in columnar support adjacent to the one end, said first fastener having a square shank mateably mounted in the registered square apertures holding the first arm relative to the columnar support, and a second fastener mounted in the square aperture in the upper arm and square aperture in the columnar support adjacent to the other end for releasably holding the second arm relative to the columnar support.

14. An apparatus for windably receiving and storably holding for rapid removal of an elongated continuous flexible insulated conductive wire comprising: an elongated columnar support having a flat longitudinal column, said flat column having a pair of longitudinally spaced square apertures formed therein, each of said square apertures having a pair of opposed corners defining a diagonal being aligned with each other and being substantially parallel to the length of the column, a rest end formed integral with one end of the flat column, and a support head formed integral with the other end of the flat column, said support head having a flat arcuate band having one end formed integral with said other end of the flat column and a mounting aperture formed in the free end of the arcuate band, an elongated lower arm being flat and having a pair of opposed edges extending the length of the arm, said lower arm having a lower arm square aperture adjacent to one end, said lower arm square aperture having a pair of opposed sides substantially parallel to the edges of the lower arm; a lower fastener securing the lower arm to the column, said lower fastener including a bolt extending through the aperture adjacent to the rest end of the column and through the aperture in the lower arm, said bolt having a head and a square shank adjacent to the head, said square shank being mateably positioned in the aperture of the lower arm and one aperture in the column adjacent to the rest end to hold the lower arm in an attitude, whereby one edge of the lower arm forms an acute angle with that portion of the column adjacent to the rest end, said bolt having a threaded portion having one end formed integral with the square shank, said fastener including a nut threadedly mounted on the threaded portion of the bolt; and an elongated upper arm having a circular tubular body having a center axis along the length of the tubular body; said upper arm having a flat end formed integral with one end of the tubular body; said upper arm having a flat end formed integral with one end of the tubular body; said flat end having an upper arm square aperture formed therein with a pair of opposed sides of the apertures being parallel to the axis of the tubular body; and an upper fastener releasably securing the upper arm to the column; said upper fastener including an upper bolt; said upper bolt havng an upper head; an upper square shank formed integral with the upper head and an upper threaded portion formed integral with the upper square shank; the upper square shank of the upper bolt being mateably and removably mounted in the upper arm square aperture and the other square aperture in the column adjacent to the support head to hold the upper arm in an attitude, whereby the center axis of the tubular body forms an acute angle with that portion of the column adjacent to the support; said upper fastener includes a wing nut mounted on the upper threaded portion of the upper bolt for releasably holding the upper square shank in said other square aperture in the column and the square aperture in the upper arm, whereby release of wing nut allows the upper square shank to be removed from one of said apertures to allow the upper arm to pivot toward the lower arm to facilitate removal of a wound wire from the upper and lower arms.

* * * * *

UNITED STATES PATENT OFFICE
CERTIFICATE OF CORRECTION

PATENT NO. : 4,277,035
DATED : July 7, 1981
INVENTOR(S) : John M. Gaski

It is certified that error appears in the above-identified patent and that said Letters Patent are hereby corrected as shown below:

Column 2, line 19; after "fastener" insert --16--

Column 3, line 67; "alongated" should be --elongated--

Column 6, line 43; "apertures" should be --aperture--

Signed and Sealed this

Twenty-second Day of September 1981

[SEAL]

Attest:

Attesting Officer

GERALD J. MOSSINGHOFF

Commissioner of Patents and Trademarks